United States Patent [19]

Ijitsu et al.

[11] Patent Number: 5,440,696
[45] Date of Patent: Aug. 8, 1995

[54] DATA PROCESSING DEVICE FOR REDUCING THE NUMBER OF INTERNAL BUS LINES

[75] Inventors: Kenji Ijitsu, Yokohama; Masanobu Yuhara; Hidenobu Ohta, both of Kawasaki, all of Japan

[73] Assignee: Fujitsu Limited, Kanagawa, Japan

[21] Appl. No.: 84,451

[22] Filed: Jul. 1, 1993

Related U.S. Application Data

[63] Continuation of Ser. No. 548,535, Jul. 5, 1990, abandoned.

[30] Foreign Application Priority Data

Jul. 7, 1989 [JP] Japan ................. 1-174253

[51] Int. Cl.⁶ ............................................. G06F 13/00
[52] U.S. Cl. .................................. 395/308; 364/238.4; 364/240; 364/240.2; 364/240.5; 364/239; 364/244.3; 364/DIG. 1; 395/445
[58] Field of Search ............... 395/325, 425, 250, 275

[56] References Cited

U.S. PATENT DOCUMENTS

| | | | |
|---|---|---|---|
| 4,245,301 | 1/1981 | Rokutanda et al. | 395/325 |
| 4,315,308 | 2/1982 | Jackson | 395/325 |
| 4,933,835 | 6/1990 | Sachs et al. | 395/425 |
| 4,939,641 | 7/1990 | Schwartz et al. | 395/425 |
| 4,958,271 | 9/1990 | Yoshida et al. | 395/275 |
| 4,989,140 | 1/1991 | Nishimakai et al. | 395/400 X |
| 5,111,425 | 5/1992 | Takeuchi et al. | 395/425 |
| 5,113,180 | 5/1992 | Gupta et al. | 340/747 |
| 5,185,878 | 2/1993 | Baror et al. | 395/425 |
| 5,218,686 | 6/1993 | Thayer | 395/425 |
| 5,220,651 | 6/1993 | Larson | 395/250 |
| 5,283,880 | 2/1994 | Marciar-Garza | 395/425 |

FOREIGN PATENT DOCUMENTS

| | | |
|---|---|---|
| 320099 | 3/1989 | European Pat. Off. . |
| 63-223846 | 9/1988 | Japan . |

OTHER PUBLICATIONS

Patent Abstrcts of Japan, vol. 4, No. 160 (P-035) Nov. 8, 1980, JP-A-55 108 027 (NEC) Aug. 19, 1980, "Processor System".

*Computer Design*, 8167, vol. 28, No. 9, May 1, 1989, Ron Wilson, Tulsa, Okla., "68040 Moves Toward RISC Camp with Redesigned Pipelines, Caches", pp. 87–88.

*Electronics*, 8032, vol. 61, No. 8, Apr. 28, 1988, Bernard C. Cole, New York, N.Y., "AMD Puts Cache Memory On One Programmable Chip", p. 22.

*Primary Examiner*—Gopal C. Ray
*Attorney, Agent, or Firm*—Nikaido, Marmelstein, Murray & Oram

[57] ABSTRACT

An internal address bus, which is connected between a bus control unit and a memory control unit, is formed by a bidirectional bus. The bidirectional internal address bus is connected to an external address transferring bus which is used to transfer a write address in a system bus to the memory control unit. The bidirectional internal address bus is commonly used for renewal and invalidation of first and second buffers for an instruction cache and operand cache. Therefore, in the present invention, the number of the internal bus lines can be reduced, a control constitution can be simplified, and a consistency of contents in a plurality of internal buffers and the main memory can be easily maintained.

21 Claims, 7 Drawing Sheets

DATA PROCESSING DEVICE FOR REDUCING THE NUMBER OF INTERNAL BUS LINES

This application is a continuation of application Ser. No. 07/548,535 filed Jul. 5, 1990, now abandoned.

BACKGROUND OF THE INVENTION

1. Field of the Invention

The present invention relates to a data processing device (microprocessing unit), more particularly, to a data processing device for constituting a data processing system (computer system) by a plurality of data processing devices.

2. Description of the Related Art

Recently, a computer system (data processing system) having a plurality of microprocessing units (data processing devices) and a single main memory, which are connected by a system bus, have been provided. In the data processing device constituting such a computer system, buffers for copying a part of the contents of the main memory are provided in the microprocessing unit, as high speed data access in the main memory is required in accordance with the requirement of high speed operation in recent computer systems. In the microprocessing unit, when renewing the main memory, the contents of instruction data or operand data stored in the buffers are renewed or invalidated.

Namely, in the microprocessing unit, for example, when renewing the main memory by an internal operation, exclusive internal busses are provided for both the buffer storing the instruction data and another buffer storing the operand data, respectively, so that a renewal operation or invalidation operation in the buffers can be carried out.

As described above, in the conventional data processing system having a plurality of data processing devices (microprocessing units) for use as a computer system, a buffer (instruction cache memory) for storing instruction data and another buffer (operand cache memory) for storing operand data respectively have the exclusive internal busses (or the exclusive internal bus lines), whereby renewing or invalidating of the data within the buffers is carried out. In the same manner as described above, when renewing the contents of the main memory by another microprocessing unit, the data stored in the buffers in each microprocessing unit should be also required to be renewed or invalidated.

Therefore, controlling processes for buffers in the plural microprocessing units become complicated. Additionally, the exclusive busses should be provided for both buffers (instruction cache memory and operand cache memory), and thus the number of the internal bus lines in each of the microprocessing units becomes increased. Note, this essentially prevents the microprocessing unit or the computer system from realization of high speed operation and large scale integration. Furthermore, it is difficult to maintain consistency of the contents in the internal buffer and the main memory disposed in the plural microprocessing units.

In the conventional computer system comprising a plurality of data processing devices (microprocessing units), a number of exclusive use busses are required to be connected for arranging the buffers in each of the data processing devices. Consequently, a high speed operation and a large scale integration in the data processing device are prevented, and a consistency of contents in the internal buffers included in each of the plural data processing devices and the main memory cannot be practically maintained, and the control of the data processing device or the data processing system becomes complicated.

SUMMARY OF THE INVENTION

It is an object of the present invention, in view of the above mentioned various problems in the conventional data processing device, to reduce the number of the internal buffers, to simplify the control system, and to easily maintain consistency of contents in the internal buffers and a main memory.

According to the present invention, there is provided a data processing device comprising: a bus control unit; a memory control unit; an execution unit; and internal busses, the bus control unit, the memory control unit, and the execution unit being connected by the internal busses, the internal busses including an internal address bus, connected between the bus control unit and the memory control unit, being formed by a bidirectional bus, and the internal address bus transferring a write address to the memory control unit from an exterior.

The memory control unit may comprise: an address selector, connected to the bus control unit through the bidirectional internal address bus, for selecting an instruction address and an operand address and for transferring the instruction address and the operand address to the bidirectional internal address bus; an external address buffer, connected to the bus control unit through the bidirectional internal address bus and the external address transferring bus, for holding an address transferred from the system bus; a first buffer, connected to the address selector through an instruction address bus among the internal busses, for holding copies of instruction data stored in a main memory; a first tag, connected to the address selector through an instruction address bus and to the external address buffer, for the first buffer; a second buffer, connected to the address selector through an operand address bus among the internal busses, for holding copies of operand data stored in the main memory; and a second tag, connected to the address selector through an instruction address bus and to the external address buffer, for the second buffer.

Each of the first and second tags may comprise: a read/write circuit having a validity bit for each stored data; a decoder, connected to the external address buffer, for decoding the address stored in the external address buffer to a physical address; and a comparator, connected to the external address buffer and the read/write circuit, for comparing the physical address with a reference address, wherein: the validity bit in the read/write circuit corresponding to the physical address is cleared, when the physical address coincides with the reference address.

The first tag may carry out a comparison operation responsive to control signals output from the execution unit through a first tag control line, and the second tag may carry out a comparison operation responsive to control signals output from the execution unit through a second tag control line.

The bus control unit may comprise: a first input gate connected to the bidirectional internal address bus, a first register connected to the first input gate, and a first output gate connected to the first register and the system bus; an input/output control circuit, supplied with control signals, for controlling the first input gate and the first output gate; a second input gate connected to the system bus, a second register connected to the second input gate, and a second output gate connected to the second register and the bidirectional internal address bus; and an address monitor control circuit, supplied with control signals, for controlling the second input gate and the second output gate.

The input/output control circuit may transfer an address in the bidirectional internal address bus to the system bus, when the data processing device carries out a read operation or a write operation. The address monitor control circuit transfers an address in the system bus to the bidirectional internal address bus, when the data processing device is not using the system bus and another data processing device is using the system bus for writing the main memory.

According to the present invention, there is also provided a data processing device, connected to the system bus, for controlling input and output between the system bus and internal busses connected to the bus control unit; a memory control unit, connected to the bus control unit through the internal busses, for holding copies of data stored in the main memory; and an execution unit, connected to the bus control unit and the memory control unit through the internal busses and signal lines, for carrying out various instructions, wherein: an internal address bus among the internal busses, connected between the bus control unit and the memory control unit, is formed by a bidirectional bus, and the bidirectional internal address bus is connected to an external address transferring bus among the internal busses for transferring a write address in the system bus to the memory control unit.

Furthermore, according to the present invention, there is provided a data processing system having a plurality of data processing devices, a main memory, and a system bus for connecting between the processing devices and the main memory, wherein each of the data processing devices comprises: a bus control unit, connected to the system bus, for controlling input and output between the system bus and internal busses connected to the bus control unit; a memory control unit, connected to the bus control unit through the internal busses, for holding copies of data stored in the main memory; and an execution unit, connected to the bus control unit and the memory control unit through the internal busses and signal lines, for carrying out various instructions, wherein: an internal address bus among the internal busses, connected between the bus control unit and the memory control unit, is formed by a bidirectional bus, and the bidirectional internal address bus is connected to an external address transferring bus among the internal busses for transferring a write address in the system bus to the memory control unit.

Additionally, according to the present invention, there is also provided a monolithic microprocessor formed in a single semiconductor body, wherein the monolithic microprocessor comprises: a built-in cache memory; an instruction execution means, for executing an instruction and outputting a write address for accessing the built-in cache memory or an external memory; an address monitoring means, for invalidating the contents of the built-in cache memory by detecting a discrepancy between the contents of the external memory and the contents of the built-in cache memory; a terminal means, for inputting and outputting of an address; and a bidirectional internal address bus, connected among the terminal means, the instruction execution means, and the address monitoring means, for transferring a write address output from the instruction execution means and an external write address to the address monitoring means.

BRIEF DESCRIPTION OF THE DRAWINGS

The present invention will be more clearly understood from the description of the preferred embodiments as set forth below with reference to the accompanying drawings, wherein.

DESCRIPTION OF THE PREFERRED EMBODIMENTS

Below, the preferred embodiments of a data processing system and a data processing device according to the present invention will be explained, with reference to the accompanying drawings.

Figure 1:
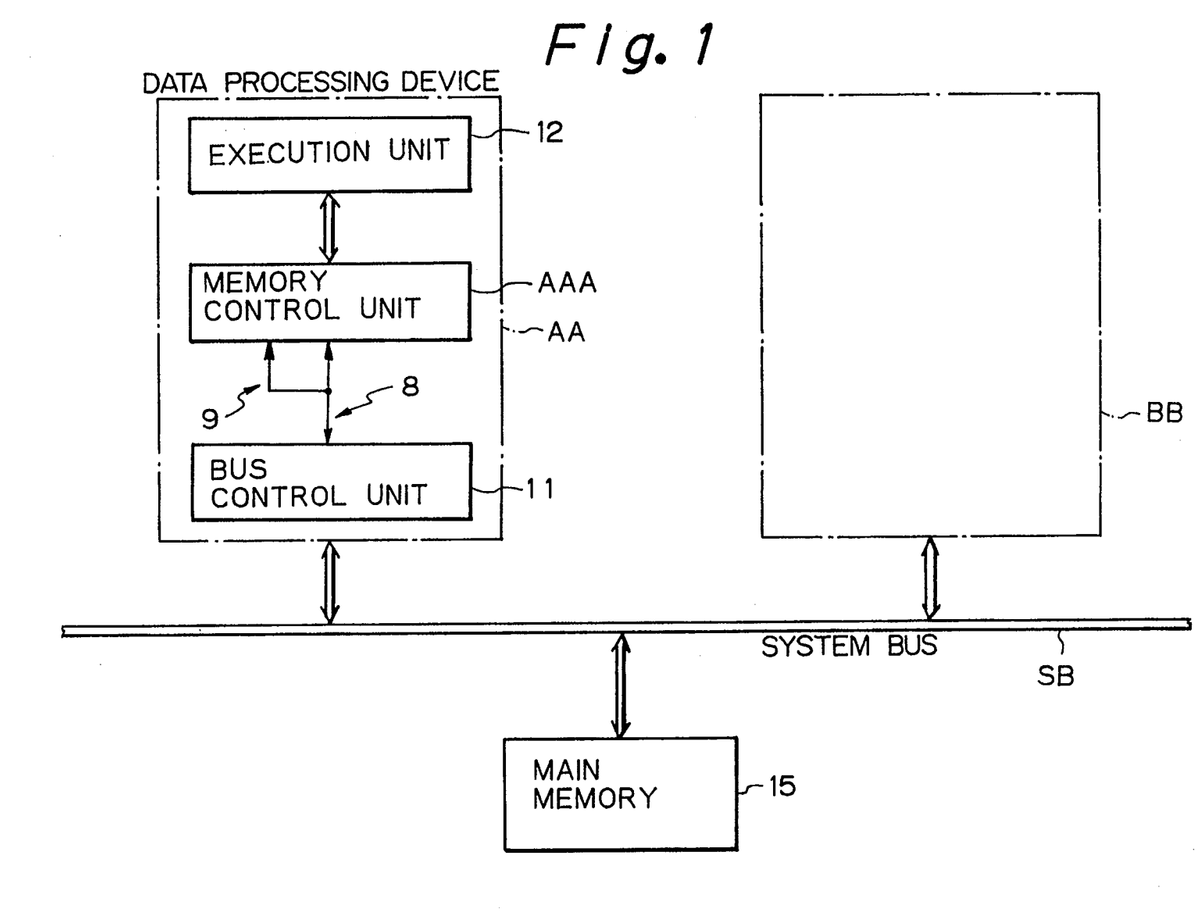
FIG. 1 is a block diagram illustrating a basic constitution of a data processing system according to the present invention.

FIG. 1 is a block diagram illustrating a basic constitution of a data processing system according to the present invention.

As shown in FIG. 1, a data processing system comprises a plurality of data processing devices AA, BB, a main memory 15, and a system bus SB for connecting the data processing devices AA, BB to the main memory 15. Each data processing devices AA (BB) comprises a bus control unit 11, a memory control unit AAA, an execution unit 12, and internal busses 8,9 (5,6) by which the bus control unit 11, the memory control unit AAA, and the execution unit 12 are respectively connected with each other. The internal bus 8 is formed by a bidirectional internal bus which provides an operand address between the memory control unit AAA and the bus control unit 11. This bidirectional internal bus 8 is connected to an external address transferring busses 9 for transferring a write address within the system busses SB to the memory control unit AAA.

As a result of the above, for example, in a computer system comprising a plurality of microprocessing units (AA,BB), the bidirectional internal bus 8 is commonly used both for renewal of the main memory 15 by internal operation of respective microprocessing devices (for example, the monolithic microprocessor AA) and for renewal of the main memory 15 by the other microprocessing devices (for example, the monolithic microprocessor BB). This enables reduction of the number of the internal bus lines, to simplify a control constitution, and to easily hold a consistency of contents in a plurality of buffers (1,3) and the main memory 15.

Figure 2:
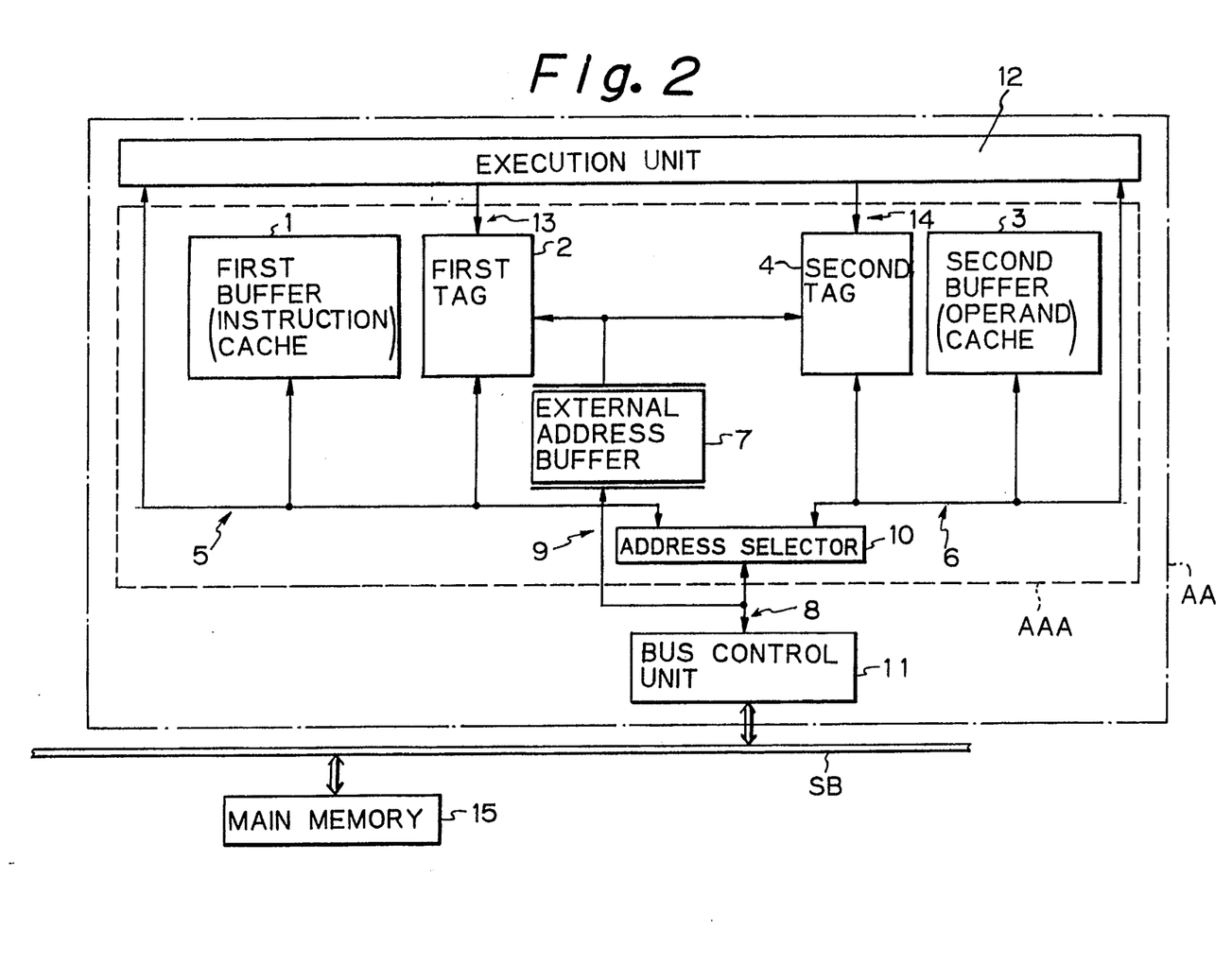
FIG. 2 is a block diagram illustrating a constitution of a data processing device according to the present invention.

FIG. 2 is a block diagram illustrating a constitution of a data processing device according to the present invention. In FIG. 2, a first buffer 1, which is used as an instruction cache memory, mainly holds copies of contents (instruction data) stored in the main memory 15, and a first tag 2, which includes an address of the instruction data held in the first buffer 1, comprises a memory portion capable of indicating whether the data held in the first buffer 1 is valid or invalid. The first tag 2 compares an address held in an external address buffer 7 with the address in the first tag 2, and if both addresses coincide each other, the tag 2 changes the validity bit so that the storage for the address is specified as invalid. Similarly, a second buffer 3, which is used as an operand cache memory, mainly holds copies of contents (operand data) stored in the main memory 15, and a second tag 4, which includes an address on the instruction data held in the second buffer 3, comprises a memory portion capable of indicating whether the data held in the second buffer 3 is valid or invalid. The second tag 4 compares an address held in the external address buffer 7 with the address in the second tag 4, and if both addresses coincide with each other, the tag 4 changes the validity bit so that the storage for the address is specified as invalid.

An instruction address bus 5, which is used for transferring the instruction address, is connected to the first buffer 1, the first tag 2, and execution unit 12, and an address selector 10. The instruction address bus 5 is so constituted that instruction address signals are transmitted through the instruction address bus 5 to the first buffer 1, the first tag 2, and the execution unit 12, respectively, when the execution unit 12 inputs the instruction data. An operand address bus 6, which is used for transferring the operand address, is connected to the second buffer 3, the second tag 4, the execution unit 12, and the address selector 10. The operand address bus 6 is so constituted that operand address signals are transmitted through the operand address bus 6 to the second buffer 1, the second tag 2, and the execution unit 12, respectively, when the execution unit 12 inputs the operand data.

The external address buffer 7 is used for holding an address transferred from a system bus SB through the external address transferring bus 9. The bidirectional internal bus 8 transfers address information between the memory control unit AAA and the bus control unit 11. The external address transferring bus 9 transfers address information on the bidirectional internal bus 8 to the external address buffer 7. The address selector 10 selects an instruction address and an operand address, and transfers them to the bidirectional internal bus 8.

The bus control unit 11 is so constituted that a write address within the system bus SB is transferred to the bidirectional internal busses 8, when opening the system busses SB, an internal input/output control, and busses for external access. The execution unit 12 executes an instruction stored in the main memory 15, and controls the data processing device AA.

A first tag control line 13 specifies a comparison operation in the first tag 2, and controls whether or not the comparison operation is to be carried out. The second tag control line 14 specifies a comparison operation in the second tag 4, and controls whether or not the comparison operation is to be carried out.

In the embodiment described above, the operand address generated by the write operation at the execution unit 12 is transferred through the operand address bus 6 to the address selector 10. The address selector 10 outputs the operand address to the bidirectional internal bus 8, and the output operand address is transferred to the external address buffer 7 through the external address transferring bus 9. The external address buffer 7 holds the operand address, and outputs the operand address to the first tag 2 and the second tag 4.

The first tag 2 carries out a comparison operation responsive to control signals of the first tag control line 13, and as a result of the above, invalidation is specified to the storage of the first tag 2. In the same manner, the second tag 4 carries out a comparison operation responsive to control signals of the second tag control line 14, and as a result of the above, invalidation is specified to the storage of the second tag 4. Note, if the renewal operation of the data stored in the main memory 15 is carried out by another data processing device (for example, data processing device BB), the write address from the system busses SB is output to the bidirectional internal bus 8 by the bus control unit 11, and further transferred to the external address buffer 7 through the external address transferring bus 9 which is connected to the bidirectional internal bus 8.

The external address buffer 7 holds the write address, and outputs the write address to the first tag 2 and the second tag 4. In the first tag 2, a comparison opeation is carried out by the control signal on the first tag control line 13, so that an invalidation is specified to the memory portion of the first tag 2. In the second tag 4, a comparison operation is carried out by the control signal on the second tag control line 14, so that an invalidation is specified to the memory portion of the second tag 4.

Figure 3:
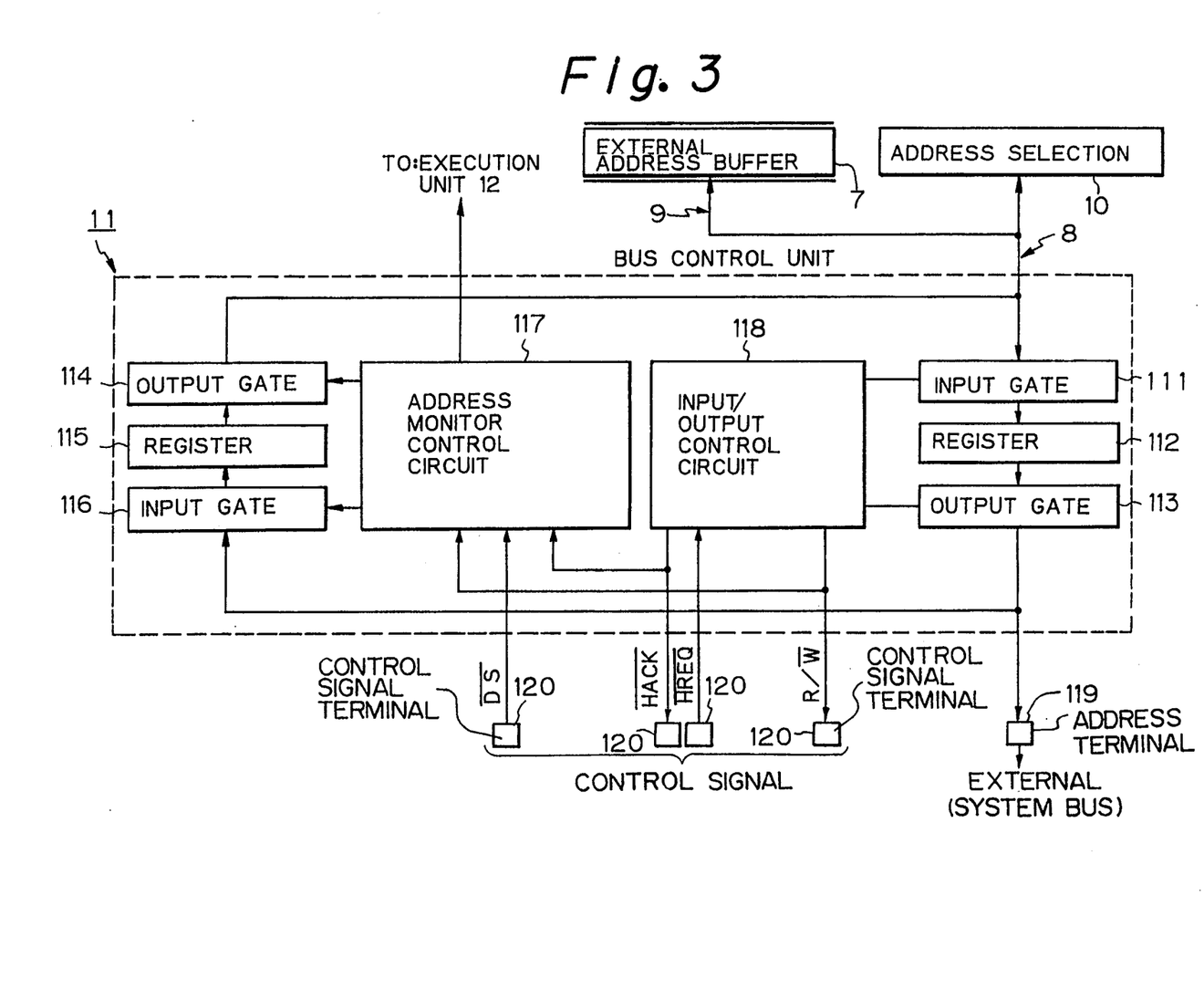
FIG. 3 is a block diagram illustrating the bus control unit shown in FIG. 2.

FIG. 3 is a block diagram illustrating the bus control unit shown in FIG. 2. As shown in FIG. 3, the bus control unit 11 comprises input gates 111,116, registers 112,115, output gates 113,114, an address monitor control circuit 117 and an input/output control circuit 118. Note, the input gate 111 is connected to the bidirectional internal bus 8 and is controlled by the input/output control circuit 118, the register 112 is provided between the input gate 111 and the output gate 113, and the output gate 113 is connected to the system bus SB through an address terminal 119 and is controlled by the input/output control circuit 118. The output gate 114 is connected to the bidirectional internal bus 8 and is controlled by the address monitor control circuit 117, the register 115 is provided between the output gate 114 and the input gate 116, and the input gate 116 is connected to the system bus SB through the address terminal 119 and is controlled by the address monitor control circuit 117. Note, the address terminal 119 is used for inputting and outputting the addresses. The bidirectional internal bus 8 provides an operand address between the memory control unit AAA and the bus control unit 11. This bidirectional internal bus 8 is connected to an external address transferring busses 9 for transferring a write address within the system busses SB to an external address buffer 7 (memory control unit AAA).

An address transferred from the internal busses through the bidirectional internal bus 8 is input to the input gate 111, transferred to the register 112, and held in the register 112. The address held in the register 112 is transferred to the system bus SB through the output gate 113. Note, the input gate 111 and output gate 113 are controlled by the signals output from the input/output control circuit 118. An address transferred from the system bus SB is input to the input gate 116, transferred to the register 115, and held in the register 115. The address held in the register 115 is transferred to the internal bus (bidirectional internal bus 8) through the output gate 114. Note, the input gate 116 and output gate 114 are controlled by the signals output from the address monitor control circuit 117.

The input/output control circuit 118 is supplied with a plurality of control signals $\overline{HACK}$, $\overline{HREQ}$, R/W through control signal terminals 120, and the input/output control circuit 118 is used to transfer an address in the internal address bus (bidirectional internal bus 8) to the external bus (system bus SB), when the data processing device carries out a read operation or a write operation.

The address monitor control circuit 117 is supplied with a plurality of control signals $\overline{DS}$, $\overline{HACK}$, R/W through the control signal terminals 120, and the address monitor control circuit 117 is used to transfer an address in the external address bus (system bus SB) to the internal bus (bidirectional internal bus 8), when the data processing device is not using (opening) the system bus SB and another data processing device is using the system bus SB for writing the main memory 15.

Figure 4:
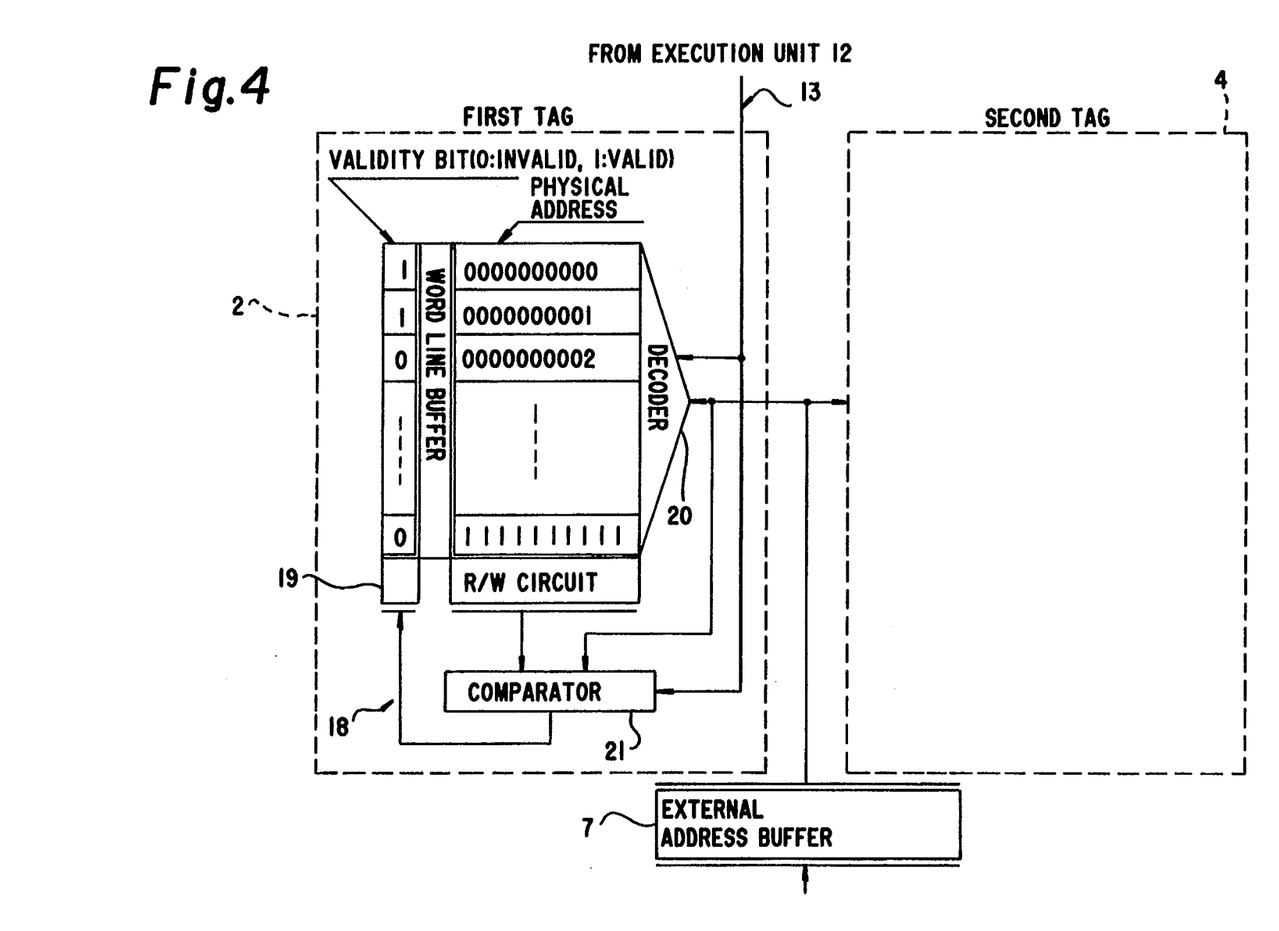
FIG. 4 is a block diagram illustrating the tags shown in FIG. 2.

FIG. 4 is a block diagram illustrating the tags shown in FIG. 2. In FIG. 4, reference numeral 13 denotes a first tag control line, 18 denotes a valid bit clear line, 19 denotes a read/write (R/W) circuit having a clear function, 20 denotes decoder, and 21 denotes comparator.

As shown in FIG. 4, an address stored in the external address buffer 7 is input to the first tag 2 and divided into two directions for decoding by the decoder 20 and comparing by the comparator 21. The first tag is searched in accordance with the address for decoding by signals of the first tag control line 13. The searched physical address is compared with a reference address by the comparator 21. When the searched physical address coincides with the reference address, a validity bit, which is stored in the tag memory, corresponding to the physical address, is cleared so that a consistency of the cache memory can be maintained. Note, the first tag 2 is provided for the instruction cache memory or the first buffer 1, and the second tag 4 is provided for the operand cache memory or the second buffer 3. Therefore, consistency between the instruction cache memory and the operand cache memory can be maintained.

Figure 5:
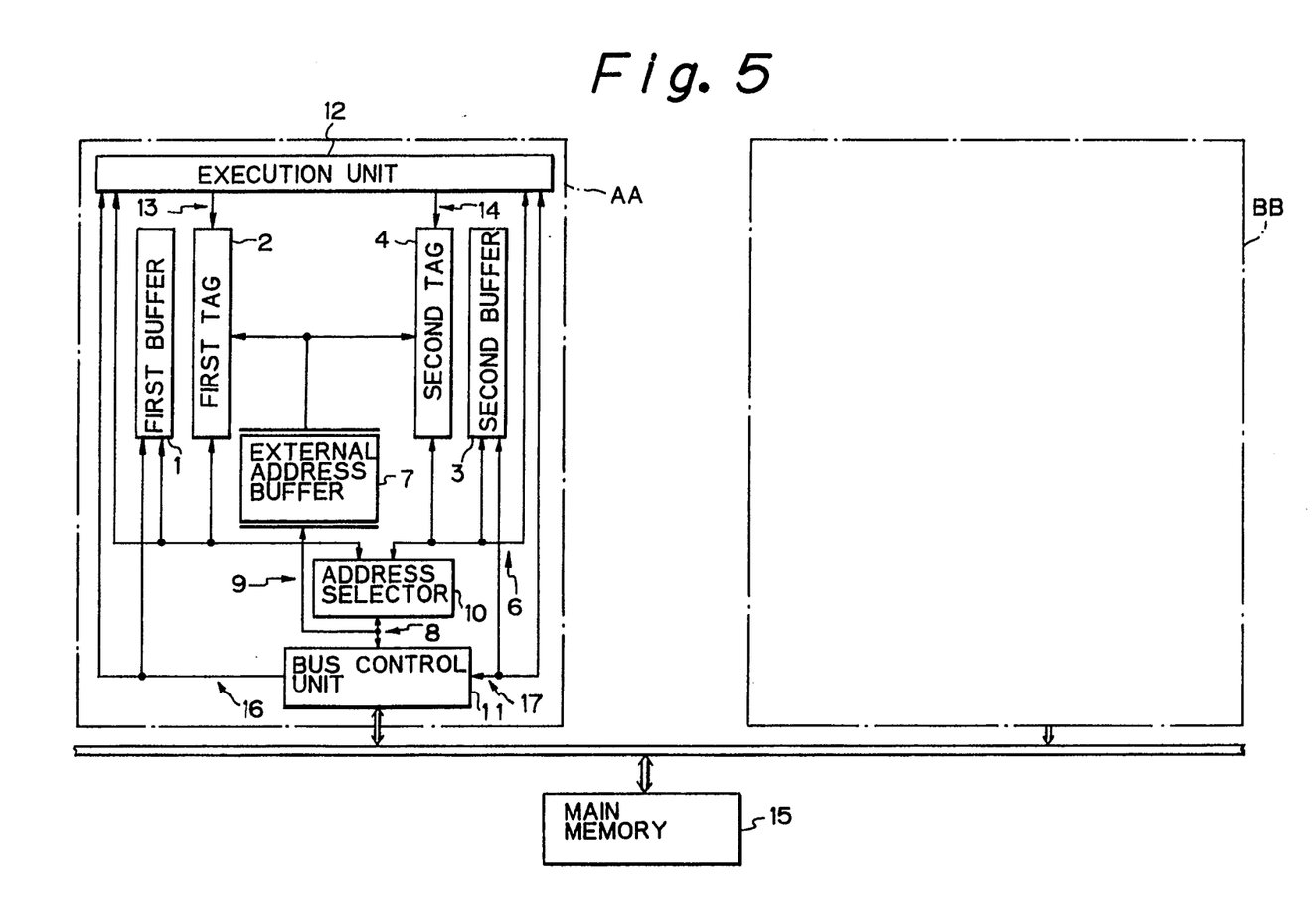
FIG. 5 is a block diagram illustrating an embodiment for the data processing system according to the present invention.

FIG. 5 is a block diagram illustrating an embodiment for the data processing system according to the present invention. In FIG. 5, the same references as in FIG. 2 indicate the same units or portions.

In FIG. 5, an instruction data bus 16 is used to connect a bus control unit 11 to a first buffer 1 and an execution unit 12 with each other, and an operand data bus 17 is used to connect a bus control unit 11 to a second buffer 3 and an execution unit 12.

Figure 6:
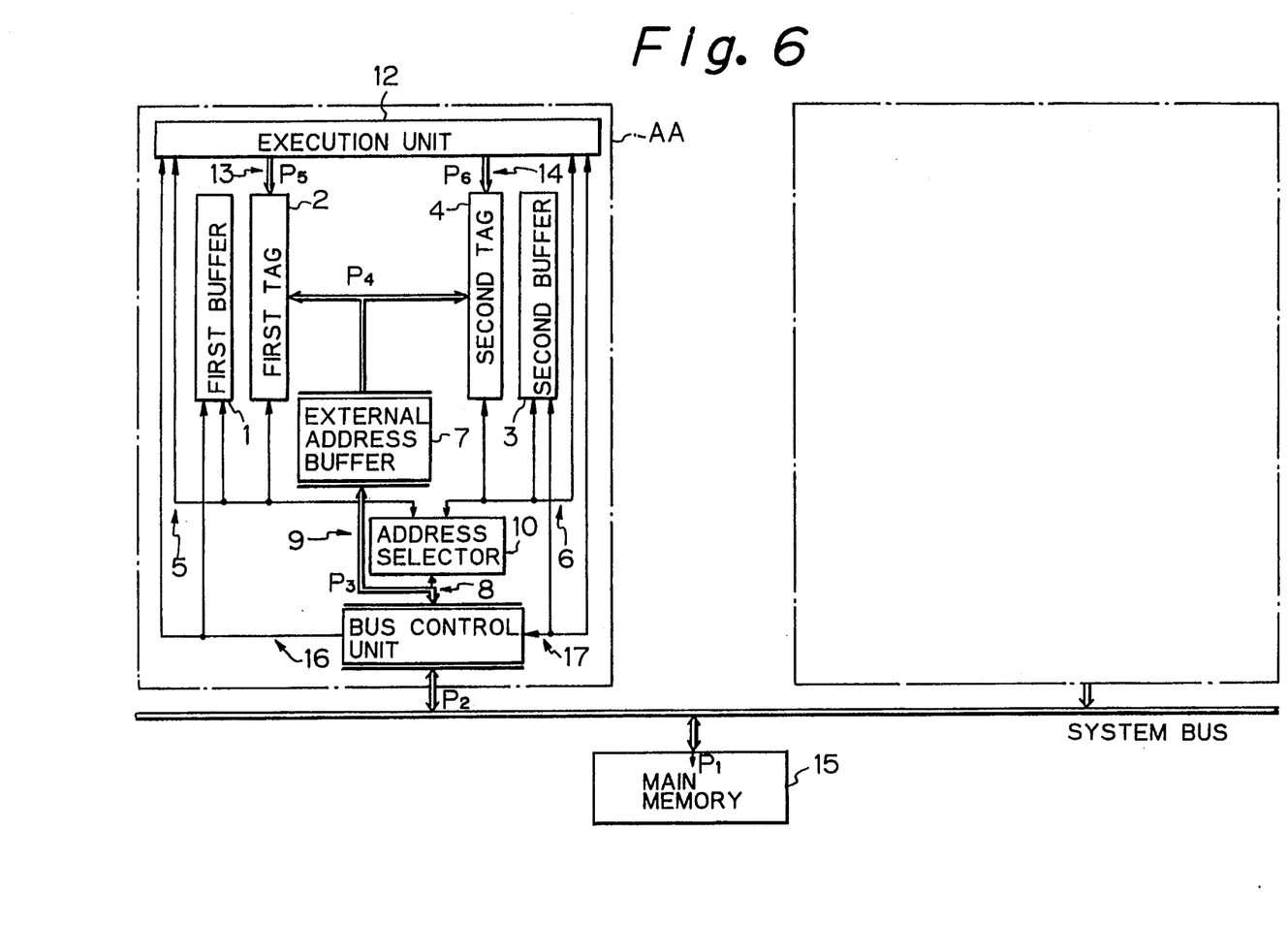
FIGS. 6 and 7 are block diagrams illustrating operations in the data processing system as shown in FIG. 5.
Figure 7:
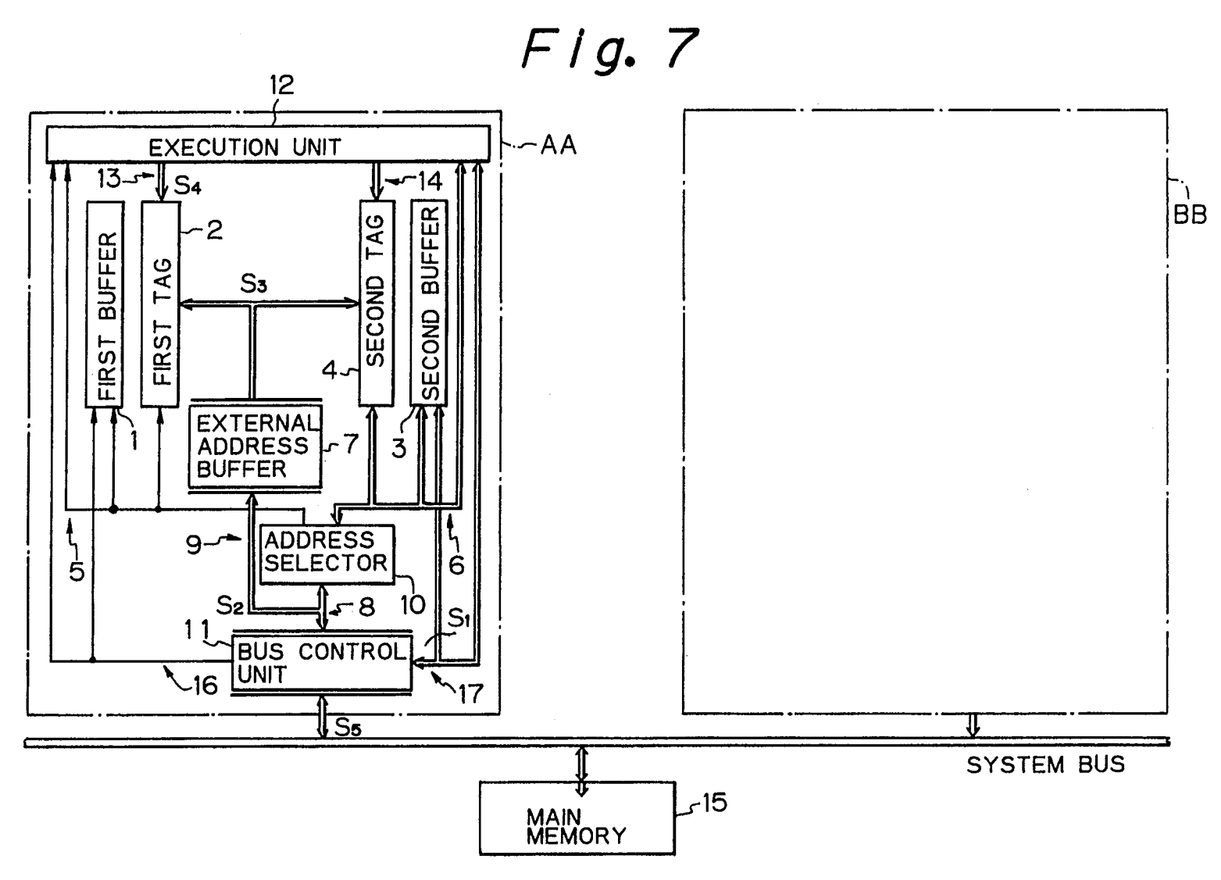

FIGS. 6 and 7 are block diagrams illustrating operations in the data processing system as shown in FIG. 5. FIG. 6 indicates a state in which system bus SB is occupied by a data processing device BB, and another state including a whole operation of a computer system at the time of renewing a main memory 15 by the data processing device BB.

First, the data processing device BB outputs address, data, and control signals to the system bus SB. In the main memory 15, the data stored in the main memory 15 is renewed ($P_1$) in accordance with the address and the data of the system bus SB. Note, if the specific data stored in the main memory 15 is renewed and the data having the same address of the specific data is held in the buffer within the data processing device AA, the specific data stored in the main memory 15 becomes different from the data held in the buffer.

Therefore, in the present embodiment, the data processing device AA reads an address on the system bus SB by using the bus control unit 11 ($P_2$), outputs the address to the bidirectional internal buses 8, and further outputs the address through the external address transferring bus 9 to the external address buffer 7 ($P_3$). The external address buffer 7 outputs the address to both of the first tag 2 and the second tag 4 ($P_4$). In the first tag 2, a comparison operation is carried out in accordance with a control signal in the first tag control line 13, and as a result thereof ($P_5$), the memory portion of the first tag 2 is specified to indicate an invalid state. In the same manner, in the second tag 4, a comparison operation is carried out in accordance with a control signal in the second tag control line 14, and as a result thereof ($P_6$), the memory portion of the second tag 4 is specified to indicate an invalid state.

FIG. 7 indicates a state in which the system bus SB is occupied by a data processing device AA, and another state including a whole operation of a computer system at the time of renewing a main memory by the data processing device AA.

First, in the data processing device AA, an operand address is output from an execution unit 12 to a second buffer 3, a second tag 4, and an address selector 10, and operand data are output from the execution unit 12 to the second buffer 3, the second tag 4, and a bus control unit 11 ($S_1$). In the address selector 10, the operand address is transferred through a bidirectional internal bus 8, the bus control unit 11, and an external address transferring bus 9 to an external address buffer 7 ($S_2$).

The external address buffer 7 holds the operand address, and outputs the operand address to a first tag 2 and the second tag 4 ($S_3$). In the first tag 2, a comparison operation is carried out by a control signal of a first tag control line 13, and as a result thereof, a memory portion of the first tag 2 is specified to indicate an invalid state. Further, in the second tag 4, second tag control line 14 specifies that a comparison operation should not be carried out ($S_4$). In the bus control unit 11, not only control signals, but also, for example, the operand data and operand address are all transferred through the system bus SB to a main memory 15. In the main memory 15, data stored in the main memory 15 are renewed ($S_5$) in accordance with the addresses and the data on the system bus SB.

As described above, according to the data processing device of the present invention, an internal bus 8 which provides the operand address between a memory control unit AAA and the bus control unit 11, consist of the bidirectional internal busses. The bidirectional internal busses are so constituted as to connect to the external address transferring bus 9 which transfers a write address within the system bus SB to the memory control unit AAA. Consequently, the number of the internal buffers can be reduced, the control system can be simplified, and consistency of contents in the internal buffers 1,3 and a main memory 15 can be easily maintained.

Many widely differing embodiments of the present invention may be constructed without departing from the spirit and scope of the present invention, and it should be understood that the present invention is not limited to the specific embodiments described in this specification, except as defined in the appended claims.

We claim:

1. A data processing device comprising:
   a bus control unit;

a memory control unit connected to said bus control unit;

an execution unit connected to said memory control unit; and internal data processing device buses connecting said bus control unit, said memory control unit, and said execution unit, said internal data processing device buses including a plurality of buses including 1) an internal address bus connected between said bus control unit and said memory control unit, and 2) an external address transferring bus connected to a bidirectional bus, said internal address bus being formed by said bidirectional bus, and said internal address bus transferring a write address input to said bus control unit from outside of said data processing device to said memory control unit, wherein said memory control unit includes an address selector, connected to said bus control unit through said bidirectional bus, said address selector for selecting an instruction address and an operand address from said execution unit and said address selector for transferring said selected instruction address and said selected operand address to said bidirectional bus, and an external address buffer, connected to said bus control unit through said bidirectional bus and said external address transferring bus, said external address buffer for holding an address transferred from a system bus through said bus control unit, said bidirectional bus and said external address transferring bus to said external address buffer, said system bus connected to said bus control unit.

2. A data processing device as claimed in claim 1, wherein said memory control unit further comprises:

a first buffer, connected to said address selector through an instruction address bus among said plurality of buses, said first buffer for storing instruction data stored in a main memory outside of said data processing device;

a first tag, connected to said address selector, said external address buffer and said first buffer through said instruction address bus, said first tag determining if said instruction data stored in said first buffer is valid;

a second buffer, connected to said address selector through an operand address bus among said plurality of buses, said second buffer for storing operand data stored in said main memory; and a second tag, connected to said address selector, said external address buffer and said second buffer through said operand address bus, said second tag determining if said operand data stored in said second buffer is valid.

3. A data processing device as claimed in claim 2, wherein each of said first and second tags comprises:

a read/write circuit which reads and writes a validity bit stored therein for each stored data in respective first and second buffers;

a decoder, connected to said external address buffer, for converting the address transferred from said system bus and stored in the external address buffer into a physical address; and a comparator, connected to said external address buffer and said read/write circuit, for comparing said physical address from said decoder with a reference address, wherein said validity bit in said read/write circuit, corresponding to said physical address, is cleared when said physical address coincides with the reference address.

4. A data processing device as claimed in claim 3, wherein said first tag carries out a comparison operation, in said comparator, which is responsive to control signals output from said execution unit through a first tag control line, and said second tag carries out a comparison operation, in said comparator, which is responsive to control signals output from said execution unit through a second tag control line.

5. A data processing device as claimed in claim 1, wherein said bus control unit comprises:

a first input gate connected to said bidirectional bus;

a first register connected to said first input gate;

a first output gate connected to said first register and said system bus;

an input/output control circuit, supplied with control signals, for controlling said first input gate and said first output gate;

a second input gate connected to said system bus;

a second register connected to said second input gate;

a second output gate connected to said second register and said bidirectional bus; and an address monitor control circuit, supplied with control signals from said system bus, said address monitor control circuit for controlling said second input gate and said second output gate to transfer addresses.

6. A data processing device as claimed in claim 5, wherein said input/output control circuit transfers addresses from said bidirectional bus to said system bus, when said data processing device carries out a read operation or a write operation.

7. A data processing device as claimed in claim 5, wherein said address monitor control circuit transfers addresses from said system bus to said bidirectional bus, when said data processing device is not using said system bus and another data processing device is using said system bus for writing to said main memory.

8. A data processing device, connected to a main memory through system bus, said data processing device comprising:

a plurality of internal buses;

a bus control unit, connected to said system bus, for controlling input and output between said system bus and said internal buses;

a memory control unit connected to said bus control unit through said internal buses, said memory control unit for storing data stored in said main memory; and an execution unit, connected to said memory control unit through said internal buses, for carrying out various instructions, wherein said internal buses includes a) an external address transferring bus and b) an internal address bus connected between said bus control unit and said memory control unit, said internal address bus is formed by a bidirectional internal address bus, and said bidirectional internal address bus is connected to said external address transferring bus, said bidirectional internal address bus for transferring a write address input to said bus control unit from said system bus to said memory control unit, wherein said memory control circuit includes an address selector, connected to said bus control unit through said bidirectional internal address bus, said address selector for selecting an instruction address and an operand address from said execution unit and said address selector transferring said selected instruction address and selected operand address to said bidirectional internal address bus, and an external address buffer, connected to said bus control unit through said bidirectional internal address bus and said external address transferring bus, said external address buffer for holding an address transferred from said system bus through said bus control unit, said bidirectional internal address bus, said external address transferring bus to said external address buffer.

9. A data processing device as claimed in claim 8, wherein said memory control unit further comprises:

a first buffer, connected to said address selector through an instruction address bus among said plurality of internal buses, said first buffer for storing instruction data stored in said main memory;

a first tag, connected to said address selector, said external address buffer and said first buffer through said instruction address bus;

a second buffer, connected to said address selector through an operand address bus among said plurality of internal buses, said second buffer for storing operand data stored in said main memory; and a second tag, connected to said address selector, said external address buffer and said second buffer through said operand address bus.

10. A data processing device as claimed in claim 9, wherein each of said first and second tags comprises:

a read/write circuit having a validity bit for each stored data in respective first and second buffers;

a decoder, connected to said external address buffer, for converting the address transferred from said system bus and stored in the external address buffer into a physical address; and a comparator, connected to said external address buffer and said read/write circuit, for comparing said physical address from said decoder with a reference address, wherein said validity bit in said read/write circuit, corresponding to said physical address, is cleared when said physical address coincides with the reference address.

11. A data processing device as claimed in claim 10, wherein said first tag carries out a comparison operation, in said comparator, which is responsive to control signals output from said execution unit through a first tag control line, and said second tag carries out a comparison operation, in said comparator, which is responsive to control signals output from said execution unit through a second tag control line.

12. A data processing device as claimed in claim 8, wherein said bus control unit comprises:

a first input gate connected to said bidirectional internal address bus;

a first register connected to said first input gate;

a first output gate connected to said first register and said system bus;

an input/output control circuit, supplied with control signals, for controlling said first input gate and said first output gate;

a second input gate connected to said system bus;

a second register connected to said second input gate;

a second output gate connected to said second register and said bidirectional internal address bus; and an address monitor control circuit, supplied with control signals from said system bus, said address monitor control circuit for controlling said second input gate and said second output gate to transfer addresses.

13. A data processing device as claimed in claim 12, wherein said input/output control circuit transfers addresses from said bidirectional internal address bus to said system bus, when said data processing device carries out a read operation or a write operation.

14. A data processing device as claimed in claim 12, wherein said address monitor control circuit transfers addresses from said system bus to said bidirectional internal address bus when said data processing device is not using said system bus and another data processing device is using said system bus for writing to said main memory.

15. A data processing system having a plurality of data processing devices, a main memory, and a system bus for connecting between said data processing devices and said main memory, wherein each of said data processing devices comprises:

a plurality of internal buses;

a bus control unit, connected to said system bus, for controlling input and output between said system bus and said internal buses;

a memory control unit connected to said bus control unit through said internal buses, said memory control unit for storing data stored in said main memory; and an execution unit, connected to said memory control unit through said internal buses, for carrying out various instructions, wherein said internal buses include a) an external address transferring bus and b) an internal address bus connected between said bus control unit and said memory control unit, said internal address bus is formed by a bidirectional internal address bus, and said bidirectional internal address bus is connected to said external address transferring bus, said bidirectional internal address bus for transferring a write address, input to said bus control unit from said system bus, to said external address transferring bus, wherein said memory control unit includes an address selector, connected to said bus control unit through said bidirectional internal address bus, said address selector for selecting an instruction address and an operand address from said execution unit and said address selector for transferring said selected instruction address and said selected operand address to said bidirectional internal address bus; and an external address buffer, connected to said bus control unit through said bidirectional internal address bus and said external address transferring bus, said external address buffer for storing an address transferred from said system bus.

16. A data processing system as claimed in claim 15, wherein said memory control unit further comprises:

a first buffer, connected to said address selector through an instruction address bus among said plurality of internal buses, said first buffer for storing instruction data stored in said main memory;

a first tag, connected to said address selector, said external address buffer and said first buffer through said instruction address bus;

a second buffer, connected to said address selector through an operand address bus among said plurality of internal buses, said second buffer for storing operand data stored in said main memory; and a second tag, connected to said address selector, said external address buffer and said second buffer through said operand address bus.

17. A data processing system as claimed in claim 16, wherein each of said first and second tags comprises:
   a read/write circuit having a validity bit for each stored data in respective first and second buffers;
   a decoder, connected to said external address buffer, for converting the address transferred from said system bus and stored in the external address buffer into a physical address; and
   a comparator, connected to said external address buffer and said read/write circuit, for comparing said physical address from said decoder with a reference address, wherein
said validity bit in said read/write circuit, corresponding to said physical address, is cleared when said physical address coincides with the reference address.

18. A data processing system as claimed in claim 17, wherein said first tag carries out a comparison operation, in said comparator, which is responsive to control signals output from said execution unit through a first tag control line, and said second tag carries out a comparison operation, in said comparator, which is responsive to control signals output from said execution unit through a second tag control line.

19. A data processing device as claimed in claim 15, wherein said bus control unit comprises:

a first input gate connected to said bidirectional internal address bus;
a first register connected to said first input gate;
a first output gate connected to said first register and said system bus;
an input/output control circuit, supplied with control signals, for controlling said first input gate and said first output gate;
a second input gate connected to said system bus;
a second register connected to said second input gate;
a second output gate connected to said second register and said bidirectional internal address bus; and
an address monitor control circuit, supplied with control signals from said system bus, said address monitor control circuit for controlling said second input gate and said second output gate to transfer addresses.

20. A data processing system as claimed in claim 19, wherein said input/output control circuit transfers addresses from said bidirectional internal address bus to said system bus, when said data processing device carries out a read operation or a write operation.

21. A data processing system as claimed in claim 19, wherein said address monitor control circuit transfers addresses from said system bus to said bidirectional internal address bus, when said data processing device is not using said system bus and another data processing device is using said system bus for writing to said main memory.

* * * * *